United States Patent [19]

Sudo et al.

[11] Patent Number: 5,344,921
[45] Date of Patent: Sep. 6, 1994

[54] METHOD FOR MANUFACTURING LIGNIN FOR CARBON FIBER SPINNING

[75] Inventors: Kenichi Sudo; Kazumasa Shimizu, all of Ibaraki, Japan

[73] Assignee: Forestry and Forest Products Research Institute, Ministry of Agriculture, Forestry and Fisheries, Ibaraki, Japan

[21] Appl. No.: 114,233

[22] Filed: Sep. 1, 1993

Related U.S. Application Data

[63] Continuation of Ser. No. 952,475, Sep. 28, 1992, abandoned, which is a continuation of Ser. No. 836,734, Feb. 19, 1992, abandoned, which is a continuation of Ser. No. 361,860, Jun. 6, 1989, abandoned.

[30] Foreign Application Priority Data

Jun. 6, 1988 [JP] Japan .................................. 63-138747

[51] Int. Cl.$^5$ .......................... C07G 1/00; C08L 97/00
[52] U.S. Cl. ..................................... 530/502; 530/500
[58] Field of Search ................................. 530/502, 500

[56] References Cited

U.S. PATENT DOCUMENTS

| | | | |
|---|---|---|---|
| 2,221,282 | 11/1940 | Champer et al. ..................... | 530/502 |
| 3,441,527 | 4/1969 | Broadhead et al. ................. | 530/502 |
| 3,463,699 | 8/1969 | Broadhead et al. ................. | 530/502 |
| 4,017,430 | 4/1977 | Briggs ................................. | 530/502 |

Primary Examiner—Frederick Krass
Attorney, Agent, or Firm—Wenderoth, Lind & Ponack

[57] ABSTRACT

A method for manufacturing lignin for carbon fiber spinning, comprising subjecting to heat treatment in a non-oxidizing atmosphere a phenolated lignin obtained by phenolation of lignin dissolved out in delignification of a woody material, or a phenolated lignin derived from digestion of a woody material with a phenol.

4 Claims, No Drawings

METHOD FOR MANUFACTURING LIGNIN FOR CARBON FIBER SPINNING

This application is a continuation of now abandoned application, Ser. No. 07/952,475, filed Sep. 28, 1992, which is a continuation of now abandoned application, Ser. No. 07/836,734, filed Feb. 19, 1992, which is a continuation of now abandoned application, Ser. No. 07/361,860, filed Jun. 6, 1989.

BACKGROUND OF THE INVENTION

1. Field of the Invention

The present invention relates to a method for manufacturing a lignin for continuous carbon fiber spinning by a heat-fusion process, employing lignin as a starting material, which is contained in woody material in an amount of about 20 to 30%.

Nowadays comprehensive studies are being made on separation or modification of cellulose, hemicellulose and lignin from woody resources for the purpose of utilizing such materials as food, forage, and chemical industrial starting materials. In certain fields, development for industrialization is going on. In the field of pulping technology, new organic solvent digestion processes are extensively studied, where an alcohol, a phenol, acetic acid, or the like are used as the digesting agent. However, success of these new technologies depends upon the accomplishment of effective utilization of lignin.

2. Description of the Related Arts

One technology of converting lignin to industrial materials of high added value relates to manufacture of carbon fiber therefrom.

One prior art publication regarding lignin carbon fiber relates to lignin-poval type carbon fiber proposed by Professor Ohtani of Gumma University on 1963. See Japanese Patent Publications No. 15727/1966, and No. 26356/1967. This process is characterized by drawing out thread from a spinning solution prepared by heating and dissolving lignin (of industrial grade) and polyvinyl alcohol in a highly concentrated aqueous NaOH solution. This process was replaced by PAN type and pitch type carbon fiber because of the cost and the properties. After 20 years therefrom, the present inventors proposed a process for manufacturing lignin for continuous spinning by hydrogenolysis, and heating lignin obtained by digestion and explosion-disintegration of wood, as well as a process of producing carbon fiber therefrom. See Japanese Laid-Open Patent Application No. 110922/1987. The carbon fiber of the former process has disadvantages such that the manufacturing cost is high because of the wet spinning process and high temperature treatment at 1400° C. or higher for vaporizing-off sodium, and the product is significantly low in strength characteristics. The latter of the above processes is now under study for industrialization. This process involves the problems of high capital cost resulting from high energy consumption and use of pressure vessels in hydrogenolysis in the spinning-lignin preparation process, and low yield of the carbon fiber.

SUMMARY OF THE INVENTION

The present invention has been accomplished from the aforementioned view point, and provides a method for manufacturing lignin for carbon fiber spinning which process makes it feasible to manufacture carbon fiber of high added value in high yield and economically from lignin separated from woody resources as mentioned above.

The method for manufacturing lignin for carbon fiber spinning of the present invention is characterized by heat treatment, in a non-oxidizing atmosphere, of a phenolated lignin derived from phenolation of lignin having dissolved out in delignification of a woody material, or a phenolated lignin derived from digestion of a woody material with a phenol.

DETAILED DESCRIPTION OF THE INVENTION

In this invention, the lignin derived from woody materials includes lignins exhausted from or produced as a by-product in paper plants or pulp plants using woody materials as a raw material; and lignins produced as a by-product in a new separation process such as a boiling process, explosive disintegration, and organic solvent digestion, or in a new pulping technology. In this invention, the lignin is phenolated, and subjected to heat treatment in a non-oxidizing atmosphere to prepare lignin material for spinning, and subsequently it is spun, made infusible, and carbonized to produce carbon fiber.

The gist of the present invention is to heat the lignin and phenolic solvent to reflux at its boiling point to produce phenolated lignin having thermal fluidity, and to continue further heating in a reaction vessel in a non-oxidizing atmosphere to complete heat treatment, thus producing lignin for spinning.

The phenolation may be conducted by heating the mixture of the above-mentioned lignin with a phenol in the presence or absence of catalyst such as an acidic organic catalyst as an accelerator. The phenols useful for the phenolation include pure substance such as phenol, cresole as well as mixtures of phenolic substances like quaiacol such as creosote, and methyl creosole and xylenol. The catalyst useful for accelerating phenolation includes organic acidic catalysts such as p-toluene sulfonic acid, sulfonyl chloride, amide salts and hydroxyamine salts thereof.

The heat treatment for densification may be conducted by heating a phenolated lignin in a non-oxidizing atmosphere. The non-oxidizing atmosphere may be prepared with a nitrogen stream under reduced pressure. The pressure reduction is preferable in many cases and the heat treatment mainly for increased viscosity or densification in the present invention is conducted under a reduced pressure of several tens of mmHg, or preferably 10 mmHg or less, and the solvent is easily recovered. The heating is conducted at a temperature and for a lapse of time sufficient for polycondensation of phenolated lignin to increase the viscosity of the solution. Generally, heating is preferably conducted to such a degree that a spinning temperature of 150° C. or more is attained. For example, heat treatment in a temperature range of from 180° to 300° C. for 30 minutes to 6 hours is preferable.

The lignin for spinning prepared as mentioned above may be continuously spun by conventional heat-fusion process.

This fiber is made infusible by heating in the air at a constant rate of temperature elevation. This process for rendering the fiber infusible may be carried out according to a conventional method, for example, by starting at 80° C. and completing at 200° C. The fiber thus made infusible is generally carbonized by elevation of the temperature at a rate of 200° C. per hour up to 800° C. in a nitrogen stream.

The present invention provides lignin for spinning with a high yield of 80% or more which is twice or more times that of the conventional method conducted by the present inventors. The yield of the carbon fiber as the final product is about 30%, which is higher than not only the conventional method but also pitch type carbon fiber.

DESCRIPTION OF THE PREFERRED EMBODIMENTS

The present invention is explained below by referring to examples. This invention, however, is not limited by these examples.

Raw material

The lignin material was obtained from white birch wood by boiling with saturated steam of 15 kg/cm$^2$ (guage pressure) for 10 minutes, disintegration by means of a refiner, removal of hemicellulose by extraction with water, and extraction with methanol.

EXAMPLE 1

10 grams of the above-described lignin material was made to react with an equal amount of phenol in a glass flask equipped with a stirrer and a cooler for 3 to 5 hours at the boiling temperature (180° C.) of phenol.

p-Toluene sulfonic acid was added to the reaction in an amount of 2% relative to the lignin. After the reaction, the reaction vessel was evacuated (to approximately 10 mmHg), and the heat treatment was conducted (for further 3 to 5 hours) at the same temperature for recovery of the unreacted phenol and for densification. Lumpy solid matter was thus obtained by the treatment.

Table 1 shows the yield of the lignin for spinning thus prepared, spinning characteristics thereof in continuous spinning according to a conventional heat-fusion process, and heat stability of the spun fiber. The spinning characteristics were evaluated at a spinning speed within which continuous spinning is feasible. The heat stability was evaluated by occurrence of fusion-bonding between fibers.

TABLE 1

| Experiment No. | Heat Treatment (Densification) Condition | | Yield (%) | Spinning Characteristics | Heat Stability |
|---|---|---|---|---|---|
| | Temperature (°C.) | Time (Hours) | | | |
| 1 | 180 | 3 | 100.3 | +++ | — |
| 2 | 180 | 4 | 96.8 | +++ | — |
| 3 | 180 | 5 | 93.8 | + | ++ |

In the Table:
Yields are shown in percentage by weight of lignin,
The symbol "+" means spinning was feasible at the rate of 100 m per minute for one +, and the number of symbols is the multiple thereof,
Thermal stability is represented by the symbols as below:
—: Fusion-bonding occurs between fibers,
+: Slight fusion-bonding is observed between fibers,
++: No fusion-bonding was observed.

As shown in Table 1, the yields of lignin for spinning were not less than 90% in all Examples, which is twice or more that of the conventional process (Japanese Laid-Open Patent Application No. 110922/1987). All samples could be spun at a spinning rate of 100 m per minute or more in the thermal fusion process. The thermal stability of the fiber was inclined to depend on the length of the heat treatment time: the fiber spun after 3 hours of heat treatment became fused during the thermal stabilization treatment, while the fibers from the lignin for spinning obtained after 4 hours or 5 hours of the treatment could be made infusible by heating up to 200° C. with a temperature elevation rate of 6° C. per hour.

By changing the heat treatment conditions, it is possible to substantially change the time required for the thermal stabilization treatment. For example, the fibers prepared by spinning the phenolated lignin heated at 300° C. for 30 minutes under reduced pressure can be made infusible by heating up to 250° C. with a heating rate of 10° C./minute.

The lignin for spinning which had been made infusible in Experiment 2 was carbonized by elevating the temperature at a rate of 100° C. per hour up to 1000° C. in a nitrogen stream in a firing furnace. Table 2 shows the properties of the resulting carbon fiber.

TABLE 2

| Properties of Lignin Carbon Fiber | |
|---|---|
| Fiber Breadth | 21.4 ± 5.44 μm |
| Tensile Strength | 52.8 ± 11.6 kg/mm$^2$ |
| Elongation | 1.06 ± 0.18% |
| Elasticity Modulus | 4.99 ± 0.63 t/mm$^2$ |

The yield of this carbon fiber was about 30%.

Table 3 shows the yield in each step from lignin to carbon fiber in comparison with that of a conventional method.

TABLE 3

| Yields in Manufacturing Steps and of Carbon Fiber | | |
|---|---|---|
| | Hydrogenolysis Method | Method of Present Invention |
| Sample Preparation Step | 0.4 | 0.9 |
| Spinning Step | 0.8 | 0.8 |
| Heat Stabilization Step | 1.0 | 1.0 |
| Carbonization Step | 0.5 | 0.4 |
| Yield of Carbon Fiber (%) | 16 | 28.8 |

From Table 3, it is understood that the present invention provides carbon fiber in a high yield.

EXAMPLE 2

The above-mentioned raw material and an equal amount of creosote were made to react in an autoclave under agitation at 300° C. for one hour. Then the reaction liquor was transferred into a glass vessel and heated under a reduced pressure to remove and recover the unreacted creosote and to prepare phenolated lignin. No catalyst was added in this Example.

The resulting phenolated lignin was densified by heating at 250° C. for 15 minutes under a reduced pressure (the pressure being the same as in Example 1) to prepare lignin for spinning.

The yield was 85.5%.

The spinning characteristics in the heat fusion method, and the stability of the fiber were tested in the same manner as in Example 1 to find that it was as excellent as the product of Example 1 for use as the starting material for carbon fiber.

In the above examples, the lignin extracted from the woody material is used as the starting material. However, the woody material can directly be treated with a phenolic substance to obtain the phenolated lignin for further heat treatment. In this case also similar results can be obtained.

What is claimed is:

1. A method for manufacturing a lignin for carbon fiber spinning, which comprises
   a first step of phenolating lignin from wood by heatinq the lignin and phenolic solvent at the boiling point of the solvent to produce phenolated lignin, wherein said first step is conducted at atmospheric pressure without removing unreacted phenol during phenolation, and further
   a second step of heat treating the resultant reaction mixture in a non-oxidizing atmosphere under reduced pressure at a temperature and time sufficient for (a) polycondensation of the phenolated lignin, (b) removing unreacted phenol and (c) increasing the viscosity of the reaction mixture, wherein the heat treatment is conducted at a temperature ranging from 180° to 300° C. for 30 minutes to 6 hours under subatmospheric pressure.

2. A method according to claim 1, wherein the phenolated lignin is prepared by phenolation of lignin dissolved out from the wood by delignification.

3. A method according to claim 1, wherein the phenolated lignin is prepared by digestion of the wood with a phenolic monomer or mixture of phenolic monomers.

4. A method according to claim 1, wherein the subatmospheric pressure is approximately 10 mmHg or less.

* * * * *